United States Patent [19]

Brooke et al.

[11] 3,914,118

[45] Oct. 21, 1975

[54] ANNEALING OF PATTERNED GLASS

[75] Inventors: Peter Howard Brooke, Greasby; Ian James Dickinson; David Cecil Kavanagh, both of Wigan; Colin Smith, Ashton-in-Makerfield, all of England

[73] Assignee: Pilkington Brothers Limited, England

[22] Filed: Aug. 9, 1974

[21] Appl. No.: 496,214

[30] Foreign Application Priority Data

Aug. 13, 1973  United Kingdom............... 38278/73

[52] U.S. Cl. ........................ 65/95; 65/94; 65/104; 65/118
[51] Int. Cl.² ......................................... C03B 13/08
[58] Field of Search .......... 65/94, 95, 96, 104, 118, 65/119, 194, 203, 350

[56]  References Cited
UNITED STATES PATENTS

| | | | |
|---|---|---|---|
| 2,774,190 | 12/1956 | Atkeson................................. | 65/95 |
| 3,311,463 | 3/1967 | Atkeson................................. | 65/119 |
| 3,508,899 | 4/1970 | Ward..................................... | 65/95 X |

*Primary Examiner*—Arthur D. Kellogg
*Attorney, Agent, or Firm*—Burns, Doane, Swecker & Mathis

[57]  ABSTRACT

A ribbon of patterned glass having contiguous areas of thicker and thinner glass is annealed by passing through a lehr having a plurality of heaters arranged for intensive reheating of the glass in spaced-apart zones extending across the lehr and of narrow width in the direction of the length of the lehr, whereby in each said zone a greater reheating occurs in thin areas of the glass than in thicker areas so that the temperature gradient existing between thick and thin areas of the glass is reduced in passage of the glass through each of the zones.

5 Claims, 8 Drawing Figures

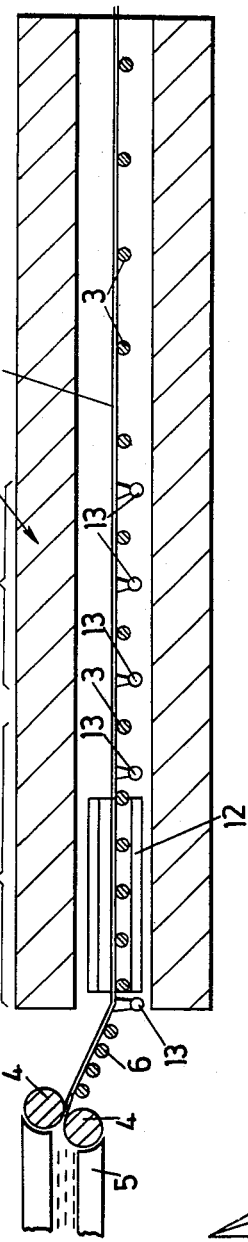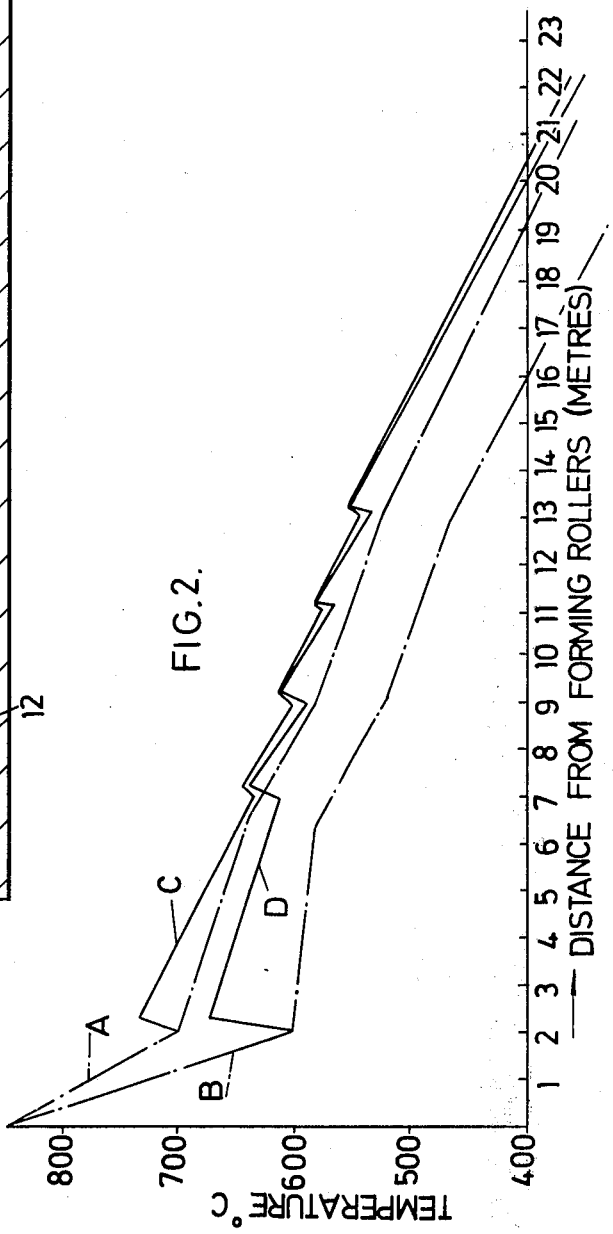

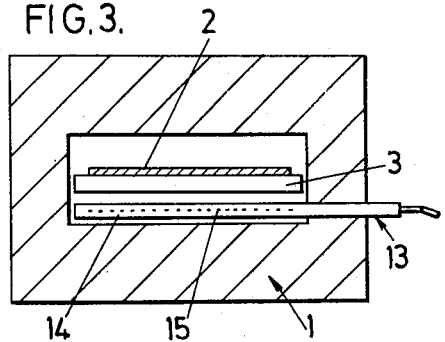
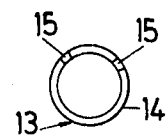
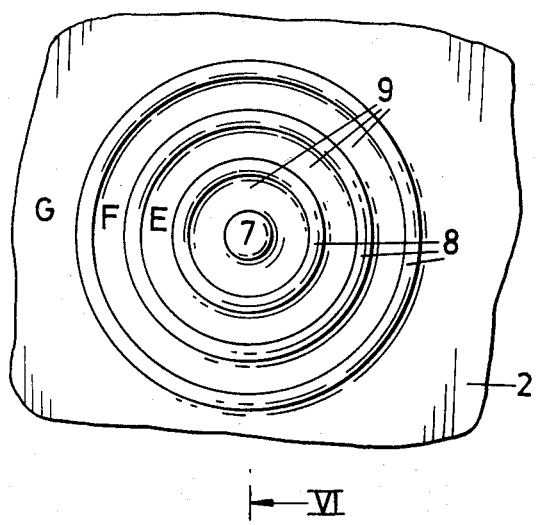
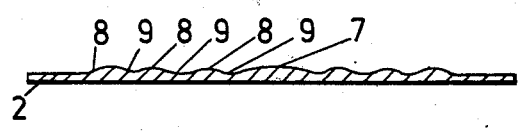

ANNEALING OF PATTERNED GLASS

BACKGROUND OF THE INVENTION

This invention relates to the annealing of patterned glass.

The present invention is particularly concerned with the annealing of rolled patterned glass which is produced by rolling molten glass from a canal between a pair of parallel spaced forming rollers. Usually the upper roller has a patterned surface which indents a pattern into the upper surface of the glass sheet. The rolled ribbon of patterned glass is fed from the forming rollers into and through an annealing lehr.

After annealing the patterned glass sheet will have a particular form of area stress distribution, which is the variation of nett stress over the glass as measured through the thickness of the glass. The nett stress is the dominant stress in the glass thickness, either tensile or compressive. Due to the pattern the thickness of the glass is different in contiguous areas, and thin areas of glass are adjacent thick areas of glass.

As the ribbon passes through the annealing lehr the thin areas of glass cool more rapidly than the thick areas of glass, and a temperature gradient exists between adjacent thick and thin areas of the glass as the glass passes through the annealing region of the lehr. This temperature gradient results in compressive stresses in the thin areas of the glass sheet and tensile stresses in the thicker areas as the sheet is further cooled. This results in net compressive stresses being present in the thinner areas of the glass sheet and nett tensile stresses being present in the thicker areas of the glass sheet.

This kind of area stress distribution in patterned glass after annealing can give rise to difficulties in cutting as there is a tendency for a running fracture to depart from the path of a score line made by a cutting tool, and to run off the score line along the path defined by the thinner areas of the glass in which the nett stress is compressive.

When the glass is deeply patterned, that is where large thickness differences exist between contiguous areas of the glass, very high permanent area stress differentials are produced between the thick and thin areas of the glass. The presence of such stress differentials can lead to spontaneous fracture of the glass either during post-annealing cooling or some time later when the glass is cold.

SUMMARY OF THE INVENTION

It is a main object of the present invention to provide a new method and apparatus for annealing a ribbon of patterned glass, in which the rate of heat loss from the glass as it is cooled through the annealing range is controlled so as to provide a desired low level of overall residual stress in the annealed glass and in which means are provided for reducing to a practically acceptable level the area stress differential which exists between adjacent thick and thin areas of the glass when annealed.

A practically acceptable level of area stress differential is that at which cutting difficulties as referred to above, do not arise, or in the case of a deeply patterned glass that at which the stress differential existing between the thick and thin areas of the glass is insufficient to give rise to spontaneous fracture of the glass subsequent to annealing.

According to the invention there is provided a method of annealing a continuous ribbon of patterned glass having contiguous areas of thicker and thinner glass, wherein as the glass is cooled from its forming temperature to the lower end of the annealing range of temperature, the ribbon is advanced through a series of separated intensive reheating zones which are narrow in width n the direction of advance of the ribbon and in each of which the thinner areas of the ribbon are subjected to a greater reheating than the thicker areas so that the temperature gradient existing between the thicker and thinner areas of the glass is reduced in passing through each zone.

Preferably the thicker and thinner areas of the glass are raised to substantially the same temperature as they pass through each zone so as to minimize the area stress differential which exists between adjacent thick and thin areas of the glass when annealed. However it may be sufficient that only a partial reduction in the temperature gradient existing between the thicker and thinner areas of the glass is achieved at some or all of the zones if the resulting area stress differential in the glass is of a practically acceptable level.

The reheating to reduce the temperature gradient may be commenced as the glass is cooled from its forming temperature.

The invention also comprehends an annealing lehr for annealing a continuous ribbon of patterned glass as the ribbon is advanced through the lehr, characterized by a plurality of heaters in the annealing lehr arranged for intensive reheating of the glass in spaced-apart zones extending across the lehr and of narrow width in the direction of the length of the lehr, whereby in each said zone a greater reheating occurs in thin areas of the glass than in thicker areas so that the temperature gradient existing between thick and thin areas of the glass is reduced in passage of the glass through each of the zones.

Preferably the heaters are gas burners each extending across the width of the lehr parallel to the glass and having burner orifices spaced along its upper surface. The gas burners may be placed above or below the path of the ribbon, or both above and below the path of the ribbon and facing one another across that path.

In some cases it may be necessary to provide a series of heaters in the length of the annealing zone in the lehr, in which case heaters may be provided at the beginning of and towards the end of the annealing zone in the lehr and at spaced-apart locations along the length of the annealing zone. In a more simple case it may be sufficient to provide a single heater at a point along the length of the annealing zone, with one or more heaters in the lehr upstream of the annealing zone.

Heaters may also be provided in the pre-annealing zone of the lehr. Such heaters are in the length of the lehr from its entrance up to the beginning of the annealing zone. In particular heaters may be located at the entrance to the lehr and at further points along the preannealing zone. These heaters reduce the larger temperature gradient which develops between the thick and thin parts of the sheet as it passes from the forming rollers to the lehr.

The invention also provides a lehr as described above in combination with heating means for the ribbon during its passage from forming rollers to the lehr entrance. This heating means minimises the large temperature differential which might otherwise exist between adjacent areas of the glass sheet before it enters the lehr.

The invention further comprehends patterned glass produced by the above-mentioned method.

BRIEF DESCRIPTION OF THE DRAWINGS

FIG. 1 is a central vertical section of a horizontal lehr through which a ribbon of patterned glass emerging from a pair of forming rollers is passed, FIG. 2 is a graph showing the temperature distribution along the glass ribbon passing through the lehr of FIG. 1, FIG. 3 is a cross-section along the line 111—111 of FIG. 1, FIG. 4 is an enlarged cross-section through a burner in the lehr of FIG. 1, FIG. 5 is a plan view of part of a ribbon of patterned glass, FIG. 6 is a section on line VI—VI of FIG. 5.

DESCRIPTION OF THE PREFERRED EMBODIMENTS

Figures 7, 8:
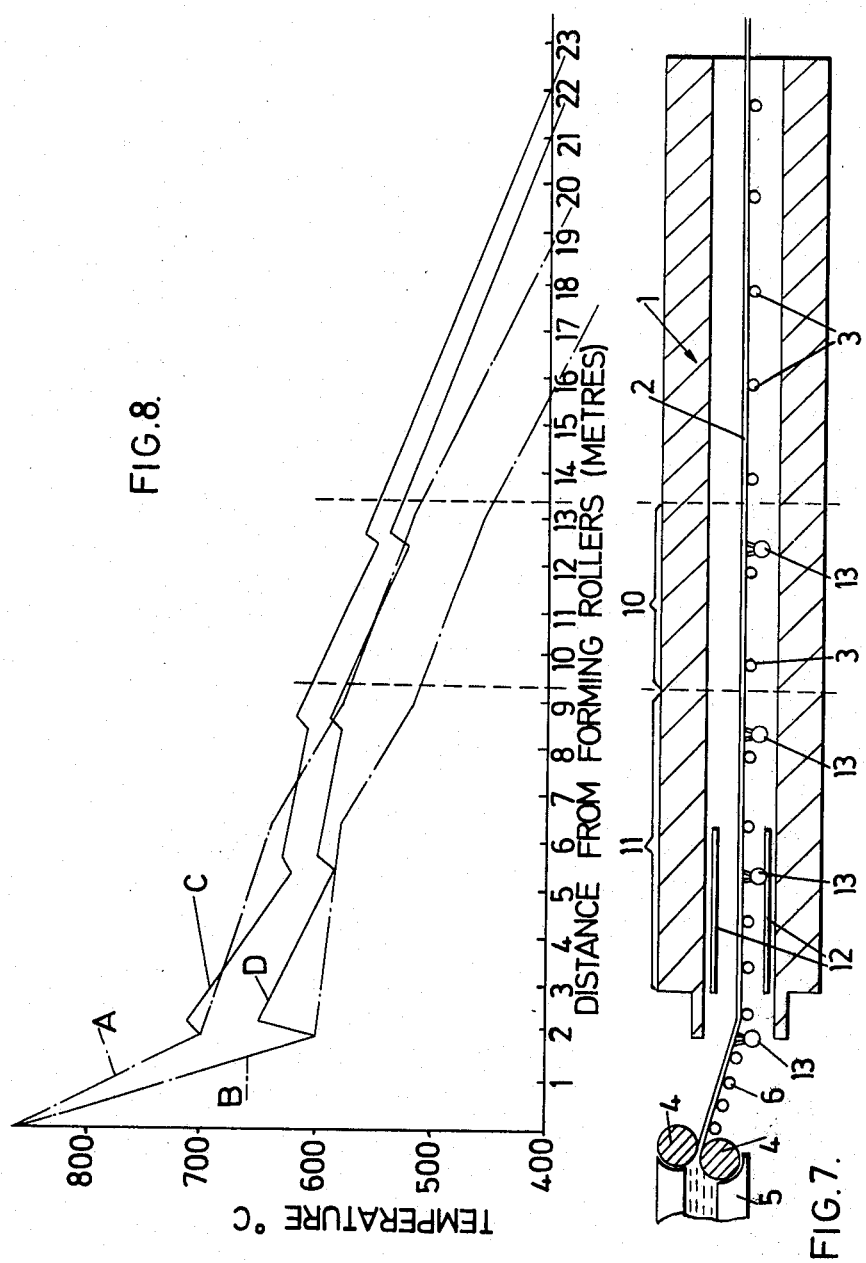
FIG. 7 is a central vertical section of a lehr similar to the lehr of FIG. 1, but having a different arrangement of burners.
FIG. 8 is a graph showing the temperature distribution along the glass ribbon in passing through the lehr of FIG. 7.

In FIG. 1 of the drawings there is shown a horizontal lehr 1 of generally rectangular cross-section through which a ribbon 2 of patterned glass is carried on conveyor rollers 3. The glass ribbon 2 is formed molten glass flowing along a forehearth to the pass between water cooled forming rollers 4 which are situated directly at the lip of the shallow canal of a tank forehearth 5.

The rolled ribbon 2 of patterned glass formed by the rollers 4 passes over a series of support rolls 6 on its way to the entrance of the lehr 1. The upper forming roller 4 has an indented pattern cut in its surfaces so as to form a corresponding pattern on the upper surface of the glass ribbon 2. By way of example the pattern may be of the form shown in FIGS. 5 and 6. This is a so-called "Bullion" pattern consisting of a heavy centre 7 surrounded by thick concentric rings 8. The areas 9 between the concentric rings 8 and surrounding the outer ring are of thinner glass. Typically the bullion centre 7 is 11 mm thick, the concentric rings 8 are 8 mm thick and the areas between the rings 8 and outside the outer ring 8 are 4 mm thick. This pattern is derived from the bullion or "bull's eye" which was produced in the old crown glass process and the bullions are spaced apart over the upper surface of the ribbon 2 in such a way that a sheet of glass embodying a number of bullions can be cut from the ribbon and such a sheet can then be cut into smaller sheets for glazing, each of which has a central bullion.

Control of the overall cooling of the glass ribbon 2 as it passes through the lehr 1 is obtained in known manner by suitable adjustment of the degree of thermal insulation provided by the lehr walls. Alternatively the lehr 1 may be of the type in which the rate of cooling of the glass ribbon is controlled by the provision of heating means in the lehr walls for instance by the provision of ducts in the lehr walls through which hot gases are passed. In either form of lehr there is an annealing zone 10 in which the glass ribbon is cooled from the upper temperature limit of its annealing range, e.g., 580°C down to the lower temperature limit of its annealing range, e.g., 520°C. The lehr has a pre-annealing zone 11 which extends from the lehr entrance to the beginning of the annealing zone 10. Radiant heating means 12 are provided in the pre-annealing zone 11 above and below and at the sides of the glass ribbon 2. The radiant heating means 12 limit the overall rate of cooling of the ribbon 2 in passing through the pre-annealing zone 11.

In order to control the stresses induced in the glass by annealing, spaced-apart gas burners 13 are provided below the ribbon 2 in the annealing zone 10. Each of the gas burners 13 comprises a pipe 14 extending across the width of the lehr below the ribbon 1. The upper surface of the pipes 14 have a series of burner orifices 15 along their length, and the pipes are fed with a gas/air mixture which burns on emission through the orifices 15 and forms a flame which provides intensive reheating of the ribbon 2 in a narrow elongate zone extending across the width of the ribbon 2 and of small width in the direction of advance of the ribbon 2.

Burner pipes 14 are provided at the beginning and towards the end of the annealing zone 10 of the lehr and a further burner pipe 14 is provided at an intermediate point along the length of the annealing zone 10. A burner pipe 14 is also provided in the pre-annealing zone just downstream of the radiant heating means 12. A burner pipe 14 is also provided at the entrance to the lehr just before the radiant heating means.

FIG. 2 shows the temperature distribution in a glass ribbon, having a pattern as shown in FIGS. 5 and 6, during passage through the lehr 1.

The chain-dotted lines A and B in FIG. 2 relate to conventional annealing of a ribbon of patterned glass without use of the burners 13. The upper chain-dotted line A represents the cooling of the thick parts of the ribbon such as the bullion centre 7 and the concentric rings 8. The lower chain-dotted line B represents the cooling of the thin body of the ribbon 2 and the thin areas 9 between the concentric rings 8.

The ribbon emerges from the pass between the rollers 5 at a uniform surface temperature of about 850°C. As the supported ribbon advances from the rollers 4 to the entrance of the lehr 1 the thicker parts of the ribbon cool to about 700°C while the thin parts of the ribbon cool more quickly to about 600°C. As the ribbon enters the lehr 1 the radiant heaters 12 reduce the cooling rate of both the thicker and thinner parts of the ribbon so that when the ribbon has reached the end of the radiant heaters 12 the thick parts of the ribbon have cooled to a temperature of about 640°C, whilst the thin parts of the ribbon will have cooled more gradually to a temperature of about 580°C. Thus the temperature gradient of 100°C existing between the thick and thin parts of the ribbon at the lehr entrance will be reduced to 60°C when the ribbon reaches the end of the radiant heaters 12. When the ribbon enters the annealing zone the thick parts of the ribbon will have cooled to about 580°C whilst the thin parts of the ribbon will have cooled to about 520°C. In passing through the annealing zone the thick parts of the ribbon will cool to the lower limit of the annealing range e.g. 520°C. In passing through the annealing zone the thin parts of the ribbon will cool a little more quickly so that the temperature gradient of 60°C existing between the thick and thin parts of the ribbon on entry of the ribbon into the annealing zone will be maintained and will in fact increase slightly as the ribbon passes through the annealing zone.

After emerging from the annealing zone 10 the glass ribbon is cooled more quickly in the post-annealing zone of the lehr and when the ribbon emerges from the lehr it has cooled to a temperature at which it can be handled.

Because of the temperature gradient which exists between the thick and thin parts of the ribbon as it passes through the annealing zone of the lehr the ribbon when finally cooled to ambient temperature has an area stress distribution constituted by a nett compressive stress existing in the thinner parts of the ribbon and a nett tensile stress existing in the thicker parts of the ribbon. In the case of a glass which has a random small pattern this area stress distribution can give rise to difficulties in cutting the ribbon into pieces. A cutting score line will traverse the thicker and thinner parts of the ribbon and towards the end of a cut there may be a tendency for the running fracture to deviate from the score line and along the thinner parts of the pattern in which there is a nett compressive stress.

In the case of the bullion pattern shown in FIGS. 5 and 6 the ribbon is cut to provide a bullion in the centre of each cut sheet of glass so that the score lines will be through the thin part of the ribbon surrounding each bullion. Cutting difficulties may not arise, but another difficulty with such a pattern, in which there is a large difference between the thickness of the thick and thin parts of the pattern, stems from the high stress differential which exists after conventional annealing between the thick and thin parts of the glass. This can lead to spontaneous fracture of the ribbon whilst it is passing through the post-annealing zone of the lehr, or fracture of the cut pieces of the ribbon can occur at some later time.

The provision of the burners 13 in the lehr 1 overcomes these difficulties. The solid line C in FIG. 2 shows how the use of the burners 13 controls the mode of cooling of the thicker parts of the ribbon, and the solid line D shows how the mode of cooling of thin parts of the ribbon is effected.

The rolled patterned ribbon leaves the forming rollers 4 at a temperature of about 850°C. When the ribbon reaches the entrance to the lehr the thick parts of the ribbon will have cooled to about 700°C and the thin parts of the ribbon will have cooled more rapidly to about 600°C. The ribbon is then reheated in passing over the first burner 13 at the entrance to the lehr 1. This burner 13 raises the thick parts of the ribbon to a temperature of about 730°C, whilst the thin parts of the ribbon are raised to a temperature of about 670°C. Thus the temperature gradient of 100°C existing between the thick and the thin parts of the ribbon at the entrance to the lehr 1 is reduced to about 60°C by the effect of the first burner 13. In passing through the radiant heaters 12 and on reaching the second burner 13 in the pre-annealing zone 11 the thick parts of the ribbon have cooled to about 630°C and the thin parts of the ribbon have cooled more gradually to about 610°C. The ribbon is re-heated again in passing over the second burner 13 in the pre-annealing zone 11 which raises the thick parts of the ribbon to a temperature of about 640°C, whilst the thin parts of the ribbon are raised to a temperature of about 635°C. In passing from the second burner 13 in the pre-annealing zone 11 to the first burner 13 in the annealing zone 10 the thick parts of the ribbon cool to about 600°C and the thin parts of the ribbon cool to a slightly lower temperature. The ribbon is reheated in passing over the first burner 13 in the annealing zone 10, raising the temperature of both the thick and thin parts of the ribbon to about 610°C. Likewise the thick and thin parts of the ribbon cool in passing from the first to the second burner 13 in the annealing zone and in passing from the second to the last burner 13 in the annealing zone. At the second burner 13 in the annealing zone the thick and thin parts of the ribbon are reheated to a temperature of about 580° C and at the last burner 13 in the annealing zone the thick and thin parts of the ribbon are reheated to a temperature of about 550°C.

By use of the burners 13 only a negligible temperature gradient exists between the thick and thin parts of the ribbon as the ribbon passes through the annealing zone as compared with the conventional annealing process, and the stress differential set up between the thick and thin parts of the ribbon when fully cooled is greatly reduced.

In the conventional annealing process as illustrated in FIG. 2 the temperature difference between the thick and the thin parts of the ribbon at exit from the lehr is about 50°C to 60°C which is about representative of the temperature gradient existing between the thick and thin parts of the ribbon as it passes through the annealing zone of the lehr. In the example described in accordance with the present invention the temperature difference existing between the thick and thin parts of the ribbon is only about 15° to 20°C at the exit from the lehr.

In the annealing process of the invention as illustrated in FIG. 2 the provision of a number of burners 13 in the annealing zone of the lehr which reheat the thick and thin parts of the ribbon to substantially the same temperature results in a maximum reduction in the area stress differential which is set up between the thick and thin parts of the ribbon when fully cooled, the stress differential thereby being minimised. However it may, in certain cases, be sufficient to partially reduce the stress differential to a level which is acceptable with respect to ease of cutting of the glass sheet, or of avoiding spontaneous fracture of the glass subsequent to annealing. This may be achieved by the use of fewer burners 13 in the annealing zone of the lehr and by reheating of the ribbon so as to achieve a parial reduction in the temperature gradient existing between the thick and thin parts of the ribbon whilst passing through the annealing zone of the lehr.

In FIG. 7 of the drawings there is shown a horizontal lehr 1 similar to the lehr of FIG. 1 but having a different distribution of burners 13.

Two burners 13 are provided in the pre-annealing zone 11 of the lehr, the first towards the downstream end of the radiant heaters 12 and the second towards the downstream end of the pre-annealing zone 11. A further burner 13 is provided at the entrance to the lehr. A single burner 13 is provided towards the end of the annealing zone 11 of the lehr.

FIG. 8 shows the temperature distribution in a glass ribbon having a pattern as shown in FIGS. 5 and 6 during passage through the lehr 1 of FIG. 7.

The chain dotted lines A and B in FIG. 8 again relate to conventional annealing of a ribbon of patterned glass without use of the burners 13. The cooling curves A and B are the same as in FIG. 2, the upper chain dotted line A representing the cooling of the thick parts of the ribbon such as the bullion centre 7 and the concentric rings 8 and the lower chain dotted line 13 representing the cooling of the thin body of the ribbon 2 and the thin areas 9 between the concentric rings 8.

The solid line C in FIG. 8 shows how the use of the burners 13 controls the mode of cooling of the thicker parts of the ribbon and the solid line D shows how the mode of cooling of the thin parts of the ribbon is effected.

The rolled patterned ribbon leaves the forming rollers A at a temperature of about 850°C. When the ribbon reaches the burner 13 at the entrance to the lehr 1 the thick parts of the ribbon will have cooled to about 700°C and the thin parts of the ribbon will have cooled more rapidly to about 600°C. The ribbon is then reheated in passing over the burner 13 at the entrance to the lehr 1. This burner 13 raises the thick parts of the ribbon to a temperature of about 710°C, whilst the thin parts of the ribbon are raised to a temperature of about 650°C. Thus the temperature gradient of 100°C existing between the thick and thin parts of the ribbon at the entrance to the lehr 1 is reduced to about 60°C by the effect of the first burner 13. In passing through the radiant heaters 12 and on reaching the first burner 13 in the pre-annealing zone 11 the thick parts of the ribbon have cooled to about 620°C and the thin parts of the ribbon have cooled more gradually to about 585°C. The ribbon is reheated again in passing over the first burner 13 in the pre-annealing zone 11 which raises the thick parts of the ribbon to a temperature of about 630°C, whilst the thin parts of the ribbon are raised to a temperature of about 600°C. In passing from the first burner 13 in the pre-annealing zone 11 to the second burner 13 towards the end of the pre-annealing zone 11 the thick parts of the ribbon cool to a temperature of about 610°C, whilst the thin parts of the ribbon cool to about 580°C. At the second burner 13 in the pre-annealing zone 11 the thick parts of the ribbon are reheated to a temperature of about 620°C, whilst the thin parts of the ribbon are reheated to about 590°C. In passing from the second burner 13 in the pre-annealing zone 11 to the next burner 13 which is towards the end of the annealing zone 10 the thick parts of the ribbon cool to a temperature of about 550°C, whilst the thin parts of the ribbon cool to about 520°C. In passing over the burner 13 in the annealing zone 10 the thick parts of the ribbon are re-heated to about 560°C, whilst the thin parts of the ribbon are reheated to about 540°C. After emerging from the annealing zone 10 of the lehr the ribbon cools at substantially the same rate and when the ribbon emerges from the lehr the thick parts of the ribbon have cooled to about 400°C whilst the thin parts of the ribbon have cooled to about 380°C.

Although in the annealing process as illustrated in FIG. 8 the thick and thin parts of the ribbon are not reheated to the same temperature, particularly in the annealing zone 10, and fewer burners are provided for reheating of the ribbon in the annealing zone as compared with the process illustrated in FIG. 2, a significant reduction in the stress difference existing between the thick and thin parts of the ribbon is still achieved. This results from the reduction in the temperature gradient which exists between the thick and thin parts of the ribbon as the ribbon cools through the annealing temperature range (e.g., about 30°C) as compared with the temperature gradient of about 60°C which exists between the thick and thin parts of the ribbon whilst cooling through the annealing temperature range in the conventional annealing process.

The following table gives examples of area stress measurements carried out on the bullion pattern shown in FIGS. 5 and 6. Example 1 relates to the annealing of this pattern of glass in the conventional manner without use of the burners 13. Examples 2 and 3 relate to annealing runs using a lehr in accordance with the present invention using reheat burners 13 as shown in FIG. 7.

| Example | NETT COMPRESSIVE STRESS (Nanometers per cm. of glass thickness) | | |
|---|---|---|---|
| | Position E | Position F | Position G |
| 1 | 230 | 140 | 70 |
| 2 | 130 | 80 | 50 |
| 3 | 110 | 70 | 30 |

Measurements of stress were taken at the positions E, F and G shown in FIG. 5, that is in the thin area E between the two inner rings 8, in the thin area F between the two outer rings 8 and in the thin area of glass G surrounding the outer ring 8 and constituting the main body of the ribbon. The values given in the table are representative of the nett compressive stress present in those ares and are based on a comparison of the path difference formed between two plane-polarized light waves passing through the thickness of the glass as determined by a known standard procedure.

In Example 1 which relates to conventional annealing the values represent high values of nett compressive stress in the inner thin parts of the pattern and it follows that in the thick parts of the glass such as the bullion centre 7 and the rings 8 there are compensating high values of nett tensile stress.

In Examples 2 and 3 which relate to bullion-patterned glass annealed in accordance with the process of FIG. 8, the nett compressive stresses in the thin inner parts of the bullion pattern are significantly reduced. The nett tensile stresses in the thick parts of the glass are correspondingly reduced so that the area stress differential between the thick and thin parts of the glass is significantly reduced as compared with the conventional annealing of Example 1. In Examples 2 and 3 the stresses are at a practically acceptable level so that the glass is capable of being cut without the running fracture departing from a score line along the thinner areas of the glass in which the nett stress is compressive. The area stress differential is also less than the level which can give rise to spontaneous fracture of the glass either during the post annealing cooling stage or later when the cold glass is stored.

In many cases it is sufficient to reduce the stresses to an acceptable level by carrying out the process of the invention in the manner such as is illustrated in FIG. 8. By carrying out the process of the invention in the manner such as is illustrated in FIG. 2 in which the thick and thin parts of the ribbon are reheated to the same temperature several times in passing through the annealing zone 10 a greater optimum reduction in the stresses can be achieved.

We claim:

1. A method of annealing a continuous ribbon of patterned glass having contiguous areas of thicker and thinner glass, wherein as the glass is cooled from its forming temperature to the lower end of the annealing range of temperature, the ribbon is advanced through a series of separated intensive reheating zones which are narrow in width in the direction of advance of the ribbon and in each of which the thinner areas of the ribbon are subjected to a greater reheating than the thicker areas so that the temperature gradient existing between the thicker and thinner areas of the glass is reduced on passing through each zone.

2. A method according to claim 1, wherein the reheating in at least one of the reheating zones takes place within the annealing range of temperature.

3. A method according to claim 2, wherein the reheating in a plurality of the reheating zones takes place at different temperatures within the annealing range of temperatures.

4. A method according to claim 2, wherein the glass is advanced through at least one said reheating zone while cooling from its forming temperature to the annealing range, so that the temperature gradient existing between the thicker and thinner areas of the glass is reduced before the glass reaches the annealing range of temperature.

5. A method according to claim 1 in which the thicker and thinner areas of the glass are raised to substantially the same temperature as they pass through each zone.

* * * * *